US006405112B1

(12) United States Patent
Rayner

(10) Patent No.: US 6,405,112 B1
(45) Date of Patent: Jun. 11, 2002

(54) VEHICLE OPERATOR PERFORMANCE MONITOR WITH ENHANCED DATA RETRIEVAL CAPABILITIES

(76) Inventor: Gary A. Rayner, 7980 Sevan Ct., #C, San Diego, CA (US) 92123

( * ) Notice: Subject to any disclaimer, the term of this patent is extended or adjusted under 35 U.S.C. 154(b) by 0 days.

(21) Appl. No.: 09/611,891

(22) Filed: Jul. 7, 2000

Related U.S. Application Data

(63) Continuation-in-part of application No. 09/405,857, filed on Sep. 24, 1999, which is a continuation-in-part of application No. 09/020,700, filed on Feb. 9, 1998, now abandoned.

(51) Int. Cl.[7] ............................................. G08G 1/017
(52) U.S. Cl. ........................ 701/35; 340/937; 340/541; 340/426; 340/540; 380/9; 380/25; 380/30; 380/49
(58) Field of Search ............................ 701/35; 340/937, 340/541, 426, 539, 540, 425.5; 358/909, 108; 380/9, 30, 25, 49, 23; 396/429, 502

(56) References Cited

U.S. PATENT DOCUMENTS

| 4,528,547 A | 7/1985 | Rodney ..................... 340/439 |
| 4,588,267 A | 5/1986 | Pastore ..................... 359/636 |
| 4,671,111 A | 6/1987 | Lemelson .................. 73/432.1 |
| 4,807,096 A | 2/1989 | Skogler et al. ............. 362/142 |
| 4,930,742 A | 6/1990 | Schofield et al. ......... 248/475.1 |
| 4,992,943 A | 2/1991 | McCracken ................... 701/35 |
| 5,178,448 A | 1/1993 | Adams et al. .............. 362/494 |
| 5,262,813 A | 11/1993 | Scharton ..................... 396/502 |
| 5,408,330 A | 4/1995 | Squicciarini et al. ....... 386/107 |
| 5,497,419 A * | 3/1996 | Hill ............................... 380/9 |
| 5,523,811 A * | 6/1996 | Wada et al. ................... 354/76 |
| 5,548,273 A | 8/1996 | Nicol et al. ................. 340/439 |
| 5,568,211 A * | 10/1996 | Bamford ..................... 396/429 |
| 5,570,087 A | 10/1996 | Lemelson .............. 340/870.05 |
| 5,570,127 A | 10/1996 | Schmidt ..................... 348/148 |
| 5,596,382 A | 1/1997 | Bamford ..................... 396/429 |
| 5,680,123 A * | 10/1997 | Lee ............................. 340/937 |
| 5,719,554 A | 2/1998 | Gagnon ....................... 340/439 |
| 5,793,308 A | 8/1998 | Rosinski et al. ............ 340/903 |
| 5,813,745 A | 9/1998 | Fant et al. ................... 362/494 |
| 5,815,093 A * | 9/1998 | Kikinis ....................... 340/937 |
| 5,877,897 A | 3/1999 | Schofield et al. ........... 359/604 |
| 5,938,321 A | 8/1999 | Bos et al. ................... 362/494 |
| 5,959,367 A | 9/1999 | O'Farrell et al. .......... 307/10.1 |
| 6,037,977 A | 3/2000 | Peterson ..................... 348/148 |
| 6,067,488 A | 5/2000 | Tano ............................. 701/35 |
| 6,151,065 A * | 11/2000 | Steed et al. ................. 348/148 |

* cited by examiner

Primary Examiner—William A. Cuchlinski, Jr.
Assistant Examiner—Tuan C To
(74) Attorney, Agent, or Firm—Calif Tervo

(57) ABSTRACT

A vehicle operator performance monitor (10) generally comprises a housing (30), a mount (40) for mounting housing (30) to a vehicle (20), such as an automobile (21), an image sensor (62) producing an image signal, an event detection circuit producing a trigger signal responsive to detection of a predetermined triggering event, a persistent memory device (100) and a capture circuit (13) receiving and capturing the image signal, terminating capture of the image signal responsive to receipt of a trigger signal, and loading the captured image signal into persistent memory device (100). At least persistent memory device (100) is readily removable from housing (30) for removal from vehicle (20) to a remote location for playback. In an alternate embodiment, a playback circuit, including an output port (125), operator control buttons (130,132) and programmed computer (74) for downloading the image signal from persistent memory (100) to output port (125), is readily removable from housing (30) playback at a remote location. A vehicle conductor (25) can provide additional sensor signals from vehicle (20). An alternative mount (40) provides for readily mechanically releasably coupling monitor (10) to vehicle (20) and to vehicle conductor (25) such that monitor (10) is readily removable from vehicle (20) to a remote location for playback of the captured signals. Monitor (10) may be integrated with a rear viewing device (16) including mirror (17).

12 Claims, 3 Drawing Sheets

VEHICLE OPERATOR PERFORMANCE MONITOR WITH ENHANCED DATA RETRIEVAL CAPABILITIES

CROSS-REFERENCE TO RELATED APPLICATIONS

This application is a continuation-in-part of co-pending application Ser. No. 09/405,857, filed Sep. 24, 1999, titled VEHICLE DATA RECORDER which is a continuation-in-part of, now abandoned, application Ser. No. 09/020,700 filed Feb. 9, 1998, titled SEQUENTIAL IMAGE STORAGE SYSTEM WITH PRE-EVENT HISTORY which are incorporated herein in their entirety.

FIELD OF THE INVENTION

This invention relates in general to a vehicle operator performance monitor that continuously monitors the actions and responses of an operator, and provides instant feedback in response to unsafe driving. A record of sensor information surrounding the time period immediately before, during, and after an unsafe driving event is also captured for later review by a driving teacher or supervisor. This information can be used for grading the proficiency of the operator, and for training or disciplinary purposes. The vehicle operator performance monitor also includes a persistent memory device wherein the memory device or, preferably also, a playback circuit or the entire monitor is readily conveniently removable from the vehicle to a remote location for playback of the memory device.

BACKGROUND OF THE INVENTION

It is widely known that automobile travel is dangerous, and collision with other vehicles or objects is a leading cause of injuries and death in our modern societies.

Devices exist that make a record of vehicle sensor data during a collision. They are publicly known as 'black box recorders'. This data may be useful retrospectively to apportion responsibility, or to understand how a collision occurred. Unfortunately, after a collision occurs it is too late to prevent it. These devices are designed to record crashes and do not actively warn drivers of unsafe driving practices that increase the risk of collision.

It is also widely known from research that the overwhelming majority of collisions are due to operator error, rather than equipment malfunction. Certain habitual poor driving styles greatly increase the risk of collision. Examples of high risk driving styles include driving too close to the vehicle in front (Tailgating), Harsh braking, over-speeding, hard cornering, and rapid lane changes. Emotional factors also contribute to poor driving decisions, as in the case of road rage.

Conventional vehicle operator performance monitors generally record vehicle data, such as velocity and acceleration. These are somewhat useful for monitoring whether a vehicle operator generally accelerates, brakes, and turns corners smoothly or violently, and may detect habitual exceeding of speed limits.

Since relatively violent maneuvers may sometimes be appropriate for avoiding a collision or unsafe condition, additional information is needed to correctly interpret acceleration and velocity data. To have the most complete understanding of these events, it is necessary to see a record of any surrounding traffic, obstacles, or road signs, as well as the demeanor of the monitored vehicle operator. It is desirable to have a record of sounds, such as vehicle horns, emergency vehicle sirens, squealing tires, and even cell phone conversations or loud music.

Untrained or non-technical people often do not understand how graphical data represented by mechanical and instrument sensors relate to specific driving actions or styles. Expert interpretation is required by trained technicians to analyze these instrument recordings. This limitation has seriously limited the usefulness and acceptance of instrumental vehicle data recorders by a larger audience. Poor driving and crashes are usually caused by a combination of several human and environmental factors. Some types of data would not be obtainable with purely instrumental mechanical sensor data for example, whether a traffic signal was green or red. Drivers of vehicles make their driving decisions almost exclusively upon what they can see, hear and feel. For a recording to have meaningful analytical or teaching value, it must record, as much as possible, the same human sensory information that the driver had while making his or her driving decisions.

It is desirable that this information should be presented in a manner that is intuitive and readily understood by any vehicle driver. Keeping the data understandable by all potential vehicle operators is absolutely essential for maximum effectiveness. With such a device, driving instructors, parents of teenage drivers, or fleet managers are able to review captured events with the driver and provide council on reducing high risk driving habits to increase the safety of the driver and to reduce the risk of loss and injury from collision.

It is also desirable that the driver be given an immediate audio or visual feedback that their driving actions have exceeded a perceived unsafe threshold level and has triggered an event recording. This instant feedback may encourage the driver to avoid driving in a manner that triggers the unit, and thus lead to safer driving.

A percentage of drivers do not treat vehicles that belong to another person or company with the same respect that they would treat their own equipment. Malicious or negligent vehicle abuse and harsh driving is common. The result is higher fuel consumption, maintenance, damage, and repair costs. Associated is an increased risk of collision and associated legal liability for the owner of the vehicle. A vehicle operator performance monitoring system would expose these driving events and hold drivers accountable.

Conventional devices exist that make a video record of the vehicle passengers or traffic or, in some cases, record sounds. One system exists that uses a digital camera to take still photographs in response to certain signals from acceleration sensors.

Passive video systems are used by law enforcement, for example, to record events at a traffic stop. Such systems are impractical for use as a vehicle operator performance monitor, as many hours of recording must usually be waded through to discover a single erratic driving event.

An existing system records sensor data together with video and audio, using VHS tape cassettes and various electronic components that are not integrated into a convenient system. The system is bulky and inconvenient to use. Tape recording systems do not always operate reliably in extreme temperature conditions and must also have regular preventive maintenance. They usually will fail to continue recording during the high decelerations present in a collision. Being mechanical in nature, they are also prone to wear-out and random failure over time.

Therefore, there has been a need for a vehicle operator performance monitor that is space efficient, easy to use, maintenance free, low cost, and has synchronized video, audio, and acceleration or other sensor data. The monitor should be easily mounted in a vehicle in a way that does not interfere with the use of the vehicle and such that it is possible for the owner of the vehicle or others to regularly bring the recorded information or the monitor to a convenient location where the record can be reviewed and analyzed using a reader, standard television or computer.

SUMMARY OF THE INVENTION

The invention is the combination of a vehicle including a rear viewing device obscuring a portion of an operator's forward view, a vehicle operator performance monitor, and means for mounting the monitor substantially within the portion of the operator's view obscured by the rear viewing device. The monitor includes a persistent memory device that is readily removable from the vehicle for playback.

The vehicle operator performance monitor generally comprises a housing, a camera, an event detection circuit, such as including an accelerometer, producing a trigger signal responsive to detection of a predetermined triggering event, such as high G-force, a persistent memory device, and a capture circuit connected to the camera for receiving and capturing an image signal therefrom, connected to the event detection circuit for terminating capture of the camera signal within a predetermined time period upon receipt of a trigger signal therefrom, and connected to the persistent memory device for storing the captured camera signal therein.

At least the persistent memory device is readily removable from the housing for removal from the vehicle to a remote location for playback. The entire monitor may be removable. A second camera may view images to the rear. The rear viewing surface may be mounted on the monitor. The size and location of the monitor do not interfere with the use of the vehicle and may allow for surreptitious use.

The monitor may include a playback circuit that, along with the persistent memory device, is readily removable from the housing for removal from the vehicle to a remote location for playback. The playback circuit includes an output port, operator controls, and a programmed computer connected to the persistent memory, to the output port, and to the operator controls for downloading the camera signal (s) from said persistent memory device to the output port responsive to a control signal from the operator controls.

In an alternate embodiment, the vehicle includes a conductor carrying a vehicle signal, such as a power signal or a vehicle sensor data signal from a vehicle sensor, such as an accelerometer, a microphone, global positioning system (GPS) receiver, speedometer, tachometer, brakes, and throttle, and the mounting means readily mechanically releasably couples the vehicle conductor to the capture circuit.

The invention will now be described in more particular detail with respect to the accompanying drawings in which like reference numerals refer to like parts throughout.

DETAILED DESCRIPTION OF THE INVENTION

Figure 1:
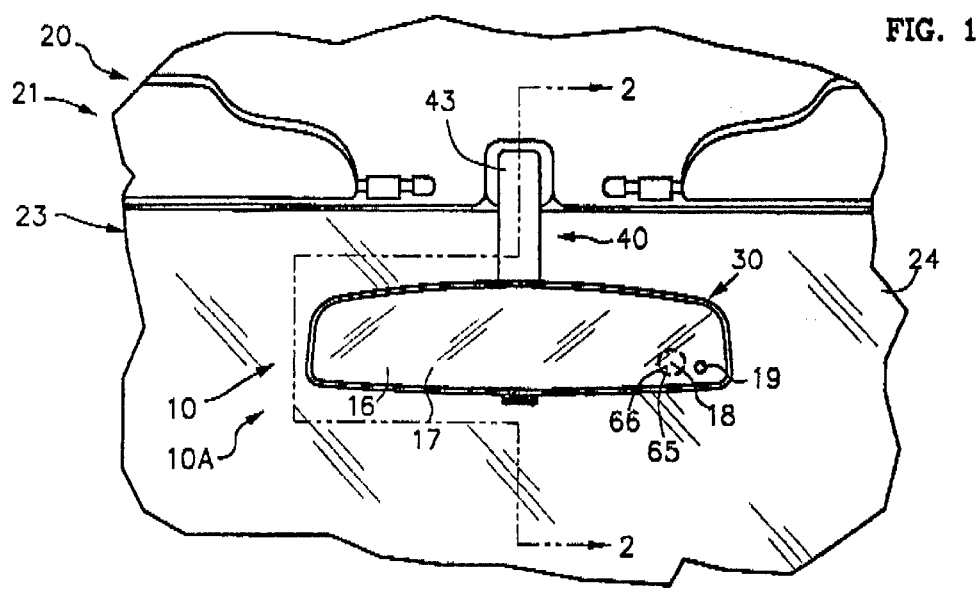
FIG. 1 is a driver's view of a first exemplary embodiment of rear view mirror and vehicle operator performance monitor of the invention in a vehicle.
Figure 2:
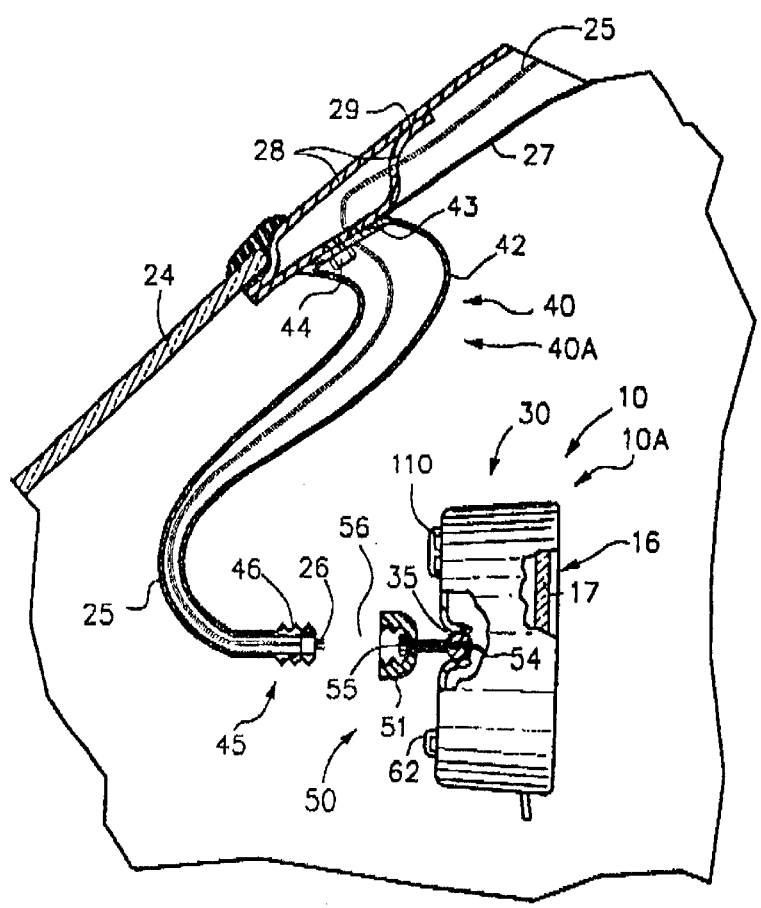
FIG. 2 is an enlarged, partially exploded, partially cut away side elevation view of the embodiment of FIG. 1, taken on line 2—2 of FIG. 1.
Figure 3:
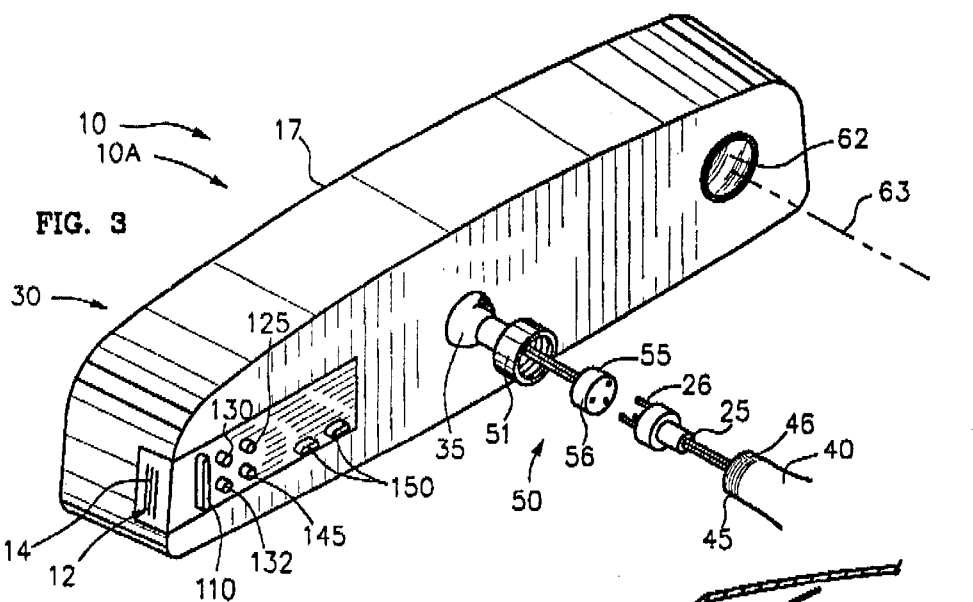
FIG. 3 is a partial, perspective view of the embodiment of FIG. 1.

FIGS. 1–3 show a first exemplary embodiment 10A of vehicle operator performance monitor 10 of the invention combined with a rear view mirror 17 in the cabin 23 of a vehicle 20, such as an automobile 21. FIG. 1 is a driver's view of monitor 10. FIG. 2 is an enlarged, partially exploded, partially cut away, side elevation view of monitor 10A of FIG. 1. FIG. 3 is a partial, perspective view of monitor 10A of FIG. 1, taken on line 2—2 of FIG. 1.

Automobile 21 includes a front windshield 24, body panels 28 including window frame 29, cabin headliner 27 and a vehicle conductor 25. Vehicle conductor 25 may comprise a cable of one or more electrical or optical conduits and would commonly include a power line from vehicle 20 and one or more input data signal lines as will be more fully discussed later.

Monitor 10A includes a housing 30. A rear viewing device 16, including a rear viewing surface, such as mirror 17, is mounted to housing 30. Other rear viewing surfaces are contemplated, such as video screens. Mirror 17 may include an aperture, a transparent area, or a partially mirrored portion, such as half-mirrored portion 18 for transmitting light to camera 65 behind mirror 17. The front of mirror 17 or housing 30 includes an aperture 19 for communicating sound to a microphone.

A mounting means 40, such as mount 40A, mounts monitor 10 in automobile 21 such that mirror 17 is positioned in the view of an operator for rearward viewing in the manner of a conventional rear view mirror. Mount 40A includes a base 42 including an attached end 43 attached to automobile 21, such as to window frame member 29, by any suitable manner, such as by fastener 44, and a free end 45 that may include external threads 46. Attaching means 50, such as internally threaded collar connector 51, connected to housing 30, is adapted for readily mechanically releasably attaching to threads 46 on free end 45 of base 42 such that monitor 10A is readily removable from automobile 21. Although the attaching means 50 includes threads 46 and collar connector 51 many other means are contemplated that are suitable.

Vehicle conductor 25 is attached to monitor 10 such as by being housed in mount 40A and terminating at free end 45 in a connector 26. A coupling means 55 connected to monitor 10A, such as mating connector 56 integral with attaching means 50, couples with connector 26 upon attachment of collar 51. Mating connector 56 is connected to input conductor 54 which is feed through pivot ball 35 into housing 30. In this manner, mechanical and electrical mounting connections for monitor 10A are both readily releasable such that monitor 10A is quickly, easily and conveniently removable from automobile 21 to a remote location for playback of captured signals.

Figure 4:
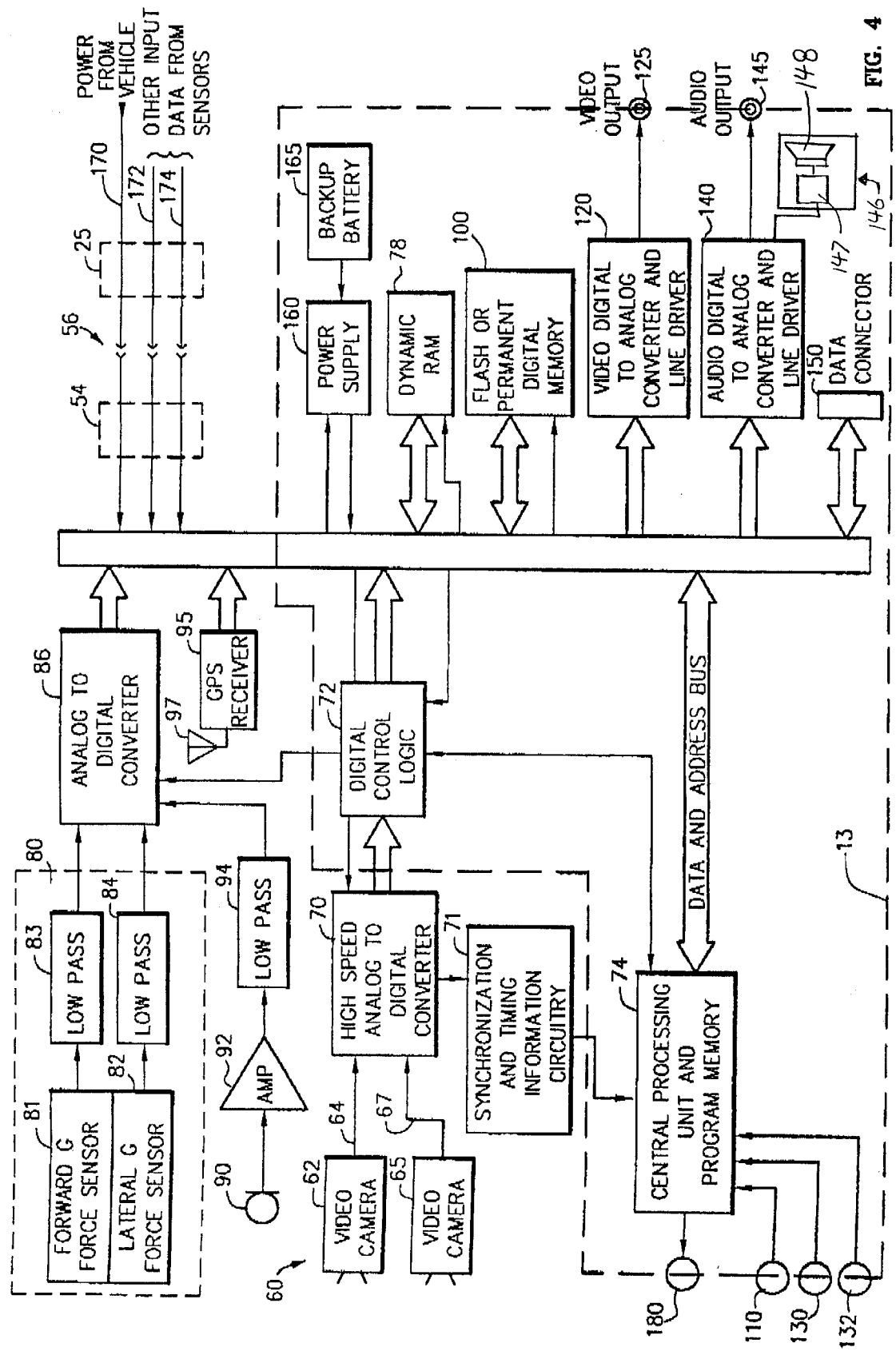
FIG. 4 is a schematic block diagram of vehicle operator performance monitor.

FIG. 4 is a schematic block diagram of the electronics and associated elements of vehicle monitor 10 that are contained within housing 30. Image sensor means 60, such as first image sensing means, such as forward viewing video camera 62, and second image sensing means, such as rearward viewing video camera 65, are connected to housing 30 for sensing optical images and for producing an image signal representing the sensed image. Cameras 62, 65, which are preferably charge-coupled device (CCD) or cMOS silicon sensor arrays, generate signals corresponding to video imagery. Referring briefly again to FIG. 3, camera 62 is mounted in housing 30 with its optical axis 63 directed forwardly with respect to vehicle 20, and to FIG. 1, camera 65 is mounted in housing 30 with its optical axis 66 directed rearward with respect to vehicle 20. Both axes 63 and 66 are thus generally aligned with the direction of travel of vehicle 20 and perpendicular to windshield 24. Preferably, the camera's fields-of-view cover the entire area forward of and rearward of monitor 10. The incorporation of additional cameras, side viewing cameras, for example, is contemplated.

Returning to FIG. 4, a high-speed analog-to-digital (A/D) convertor 70 digitizes the signals produced by cameras 62 and 65 on lines 64 and 67, respectively, and multiplexes them onto a digital data bus via digital control logic 72. Monitor 10 operates under the control of a central processing unit 74. Central processing unit (CPU) 74 may include a microprocessor, microcontroller, or similar device and associated random access memory and program memory. CPU 74 is programmed to perform the functions described in this specification. Because the descriptions of the functions below are sufficient to enable any person skilled in the art to which this invention relates to program CPU 74, program code and the manner in which it is programmed are not described in this specification. CPU 74 is synchronized to A/D converter 70 via synchronization and timing information circuitry 71. Digital logic 72 may compress or encrypt data or data stream from sensors.

Under control of CPU 74, digital signals representing the video imagery are stored in dynamic random-access memory (dRAM) 78 that is configured as a continuous-loop buffer. CPU 74 or associated address counter circuitry defines the continuous-loop scheme by employing wrap-around memory addressing, in which the highest memory location in a predetermined addressing sequence is adjacent or next to the lowest. Incoming digitized data signals are written to memory locations until all allocated locations have been written to, at which time the data signals stored at the next location in the sequence are overwritten with further incoming data signals.

Accelerometer circuit 80 includes means, such as a pair of accelerometers, such as forward accelerometer or G-force sensor 81 and lateral accelerometer or G-force sensor 82. G-force sensors 81,82 are coupled to another-A/D converter 86 via low-pass filters 83 and 84, respectively. Although accelerometers aligned with the lateral and longitudinal axes of the vehicle are described, acceleration data can be obtained from other arrangements of nonparallel accelerometers.

Microphone 90 is coupled to A/D converter 86 via an amplifier 92 and another low-pass filter 94. Microphone 90, being integrated within enclosure 30 (see FIG. 1), is particularly sensitive to sounds occurring inside cabin 23 of vehicle 20, such as the voices of the driver and any passengers. Other sounds, such as tire screeches, warning horns, sirens and collisions are also picked up.

Under control of CPU 74, A/D converter 86 multiplexes and digitizes the signals produced by these sensors. The digitized input data are stored in volatile buffer memory, such as dRAM 78, along with the digital signals representing the visual imagery.

Global positioning system (GPS) receiver 95 receives GPS satellite signals and determines from them the geographical position of vehicle 20. GPS receiver 95 and its antenna 97 are, like all other electronics and associated elements described above, disposed inconspicuously and securely inside housing 30. This location harmonizes with the location of monitor 10 on or near windshield 24 because radio frequency energy emanating from satellites above vehicle 20 penetrate windshield 24 more readily than metallic portions of vehicle 20.

CPU 74 copies data from buffer memory 78 to a more permanent non-volatile memory, such as a flash card, permanent digital memory or persistent memory 100, upon detection of a trigger signal, i.e. a data input signal at, or beyond, predetermined level representing a triggering event. For example, CPU 74 monitors the digitized signals representing the acceleration data to which G-force sensors 81 and 82 are responsive, and if CPU 74 determines that the acceleration data exceed a predetermined threshold value indicative of a collision or other event that would warrant investigation, CPU 74 copies data from buffer memory 78 to persistent memory 100.

Memories 78 and 100 thus together define a two-tier system, in which the first tier records data in a continuous-loop fashion, and the second tier provides more permanent storage for data from the first tier in response to a triggering event. Data stored in persistent memory 100 in accordance with this scheme are not overwritten unless the entire system is reset by an operator. CPU 74 may be programmed to continue data acquisition after occurrence of the triggering event for some predetermined time interval. Thus, so long as a sufficient amount of pre-event data are retained and not over-written, additional frames of visual data or other sensory data can be gathered during and after the collision and stored in memory 100 following the pre-event data.

A trigger signal, defining a triggering event, can be produced also manually by activating a "panic" or trigger button 110 by an operator, such as the vehicle driver. Thus, if the driver presses button 110, CPU 74 copies the contents of memory buffer 78 into persistent memory 100. Trigger button 110 may be particularly useful in taxicabs, buses, and similar commercial vehicles in which the driver may wish to record the actions of a passenger. It can also be useful to show traffic conditions, road rage situations, criminal attacks, and police pullovers. Trigger button 110 may be placed on the steering wheel or other convenient location and the output coupled to vehicle conductor 25 for communication with CPU 74. In other embodiments, the triggering event can be defined in still other ways, such as by activation of the vehicle horn or a security system protecting the vehicle against theft or vandalism.

CPU 74 controls a display 180, such as an LCD or LED display, to provide status information such as whether monitor 10 is powered-up and otherwise operational and whether a triggering event has occurred and the nature of the triggering event.

A playback circuit 13 at least provides for downloading the sensed signals from persistent memory 100 to an output port, such as video output connector 125. Playback circuit 13 includes operator control means, such as switch buttons 130 and 132, which produce a control signal responsive to operator activation to initiate and control the retrieval of stored data. Responsive to activation of buttons 130,132 in a predetermined manner, CPU 74 causes DRAM memory 78 to be addressed in sequence and provide the stored data on the data bus. CPU 74 also controls a video digital-to-analog (D/A) converter 120 and an audio D/A converter 140, causing them to convert the data signals read from memory 78 to analog format. A video signal representing the stored video imagery data is provided at a video output connector 125. By connecting a video monitor (not shown) to connector 125, one can view the recorded imagery and other recorded data, such as time, date, g-forces, speed and engine speed, superimposed, such as in numeric or graphical format, on the video display . An audio signal representing the stored audio data is provided at an audio output connector 145. By connecting a speaker (not shown) to connector 145, one can listen to the recorded sound. A data connector 150 is also included that provides access to the data on the data bus, either directly or via suitable input/output interface circuitry (not shown). Monitor 10 can be programmed via connector 150 as well.

An enunciator 146, such as speaker module 147, including voice simulation circuitry or recorded voice, amplifier, and speaker 148, provides aural feedback to the operator. Speaker module 147 is connected to driver 140, and produces messages indicative of sensor signals or triggering events. For example, the operator may be warned that speed, engine RPM or g-forces are excessive.

Power may be supplied by a power supply 160, battery 165 or direct from vehicle power line 170 of vehicle conductor 25 connected to monitor 10 via coupler 56 to input conductor 54. Vehicle conductor 25 can include other conductors or lines from vehicle sensors, such as speedometer signal input line 172 from the vehicle speedometer providing the vehicle speed, and auxiliary line 174 for other vehicle sensors, such as an alternate GPS receiver or tachometer, that provide data to monitor 10 for recording as described above. Many cars with remote electronic unlock also have a "panic" button on the remote that, when pressed, sets off the alarm, thereby typically flashing the car lights and beeping the horn. Line 174 can provide a sensor signal from the vehicle alarm system, such as from the panic button activation, or from the vehicle horn such that activation of the alarm or horn can provide a triggering event.

Figure 5:
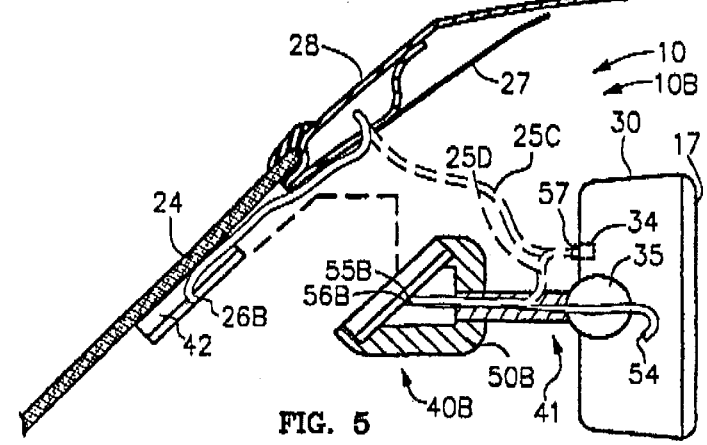
FIG. 5 is an exploded side elevation view of a second embodiment of mount for mirror and monitor.

FIG. 5 is an exploded side elevation view of a second embodiment 10B of monitor 10. In the preferred embodiment of monitor 10B, mount 40B includes a base 42 attached to windshield 24. Vehicle conductor 25 includes sliding contact connector 26B on base 42. Monitor 10B includes attaching means 50B including coupling means 55B, such as sliding contact connector 56B. Attaching means 50B slides over and attaches to base 42 as indicated by the arrow such that connector 56B couples with connector 26B. Mating connector 56B is connected to input conductor 54, which is fed through pivot ball 35 into housing 30.

Alternatively, vehicle conductor 25.may be routed directly to monitor 10B, as depicted in phantom by line 25C and coupled with input conductor 54 via quick release plug 57 into an input socket 34 connected to input line 54. Or yet alternatively, instead of passing through ball 35, input wire 54 may be routed to plug 57 as depicted in phantom by line 25D.

Figure 7:
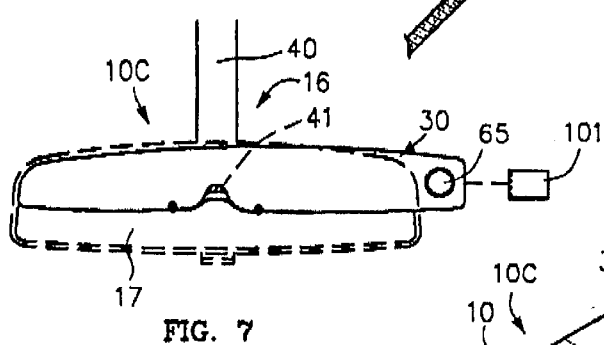
FIG. 7 is a reduced front elevation view of the embodiment of FIG. 6 mounted behind the rear view mirror.
Figure 6:
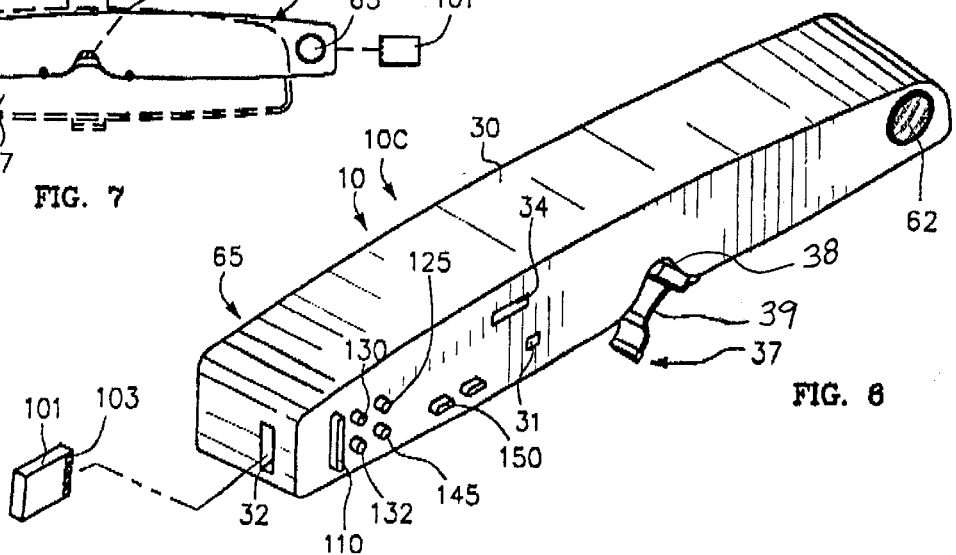
FIG. 6 is a perspective view of a third embodiment of the monitor attached to the mirror mount.

FIGS. 6 and 7 show a third embodiment 10C of monitor 10. FIG. 6 is a rear perspective view of third embodiment 10C attached to mirror mount 40 and FIG. 7 is a reduced front elevation view of embodiment 10C of FIG. 6 mounted behind rear view mirror 17. Monitor 10C includes attachment means 37 for quickly releasably attaching monitor 10C to a conventional rear view mirror device 16, such as to the horizontal portion 41 of mount 40B. Exemplary attachment means 37 includes a channel 38 adapted for receiving mirror mount 41 and a hinged latch 39 adapted to entrap the received mount 41. A portion of monitor 10C housing rear video camera 65 protrudes around mirror 16 for rearward image sensing. Input socket 34 is adapted for quick release coupling with vehicle conductor 25.

In the manners described above, mechanical and electrical mounting connection for monitors 10 are both readily releasable such that monitors 10 are quickly, easily and conveniently removable from automobile 21 to a remote location for playback of captured signals. Power for playback could be provided by battery, such as internal battery 165, or by an a/c adapter. Video output 125 and audio output 145 are readily attachable to many devices, such as a television set, for playback. Switches 130 and 132 can control playback.

Returning to FIGS. 3 and 4, as an alternate to removing the entire monitor 10 from vehicle 20 to a remote location for playback, playback circuit 13 is housed in a playback module 12 that is held in housing 30 by means well known to those in the art, such as by small detentes such that playback module 12 is readily removable from housing 30 and the remainder of monitor 10, such as by pushing rearward on end 14. The removed playback module 12 is readily connectable to many devices, such as a personal computer (PC), for retrieving the stored data. Data connector 150 could be a USB cable, for example, and readily connect to a PC. Upon reattachment, appropriate contacts couple playback circuit with the remainder circuitry of module 10.

Returning to FIGS. 6 and 7, as another alternative to removing the entire monitor 10 from vehicle 20 to a remote location for playback, persistent memory 100 may be housed in a device, such as card 101, that is readily removable from a cavity 32 in housing 30 for removal from vehicle 20 to a remote location for playback on a reader compatible with the memory medium. Suitable readers for reading most memory formats are well known in the art. Appropriate connectors 103 on card 101 couple memory 100 with monitor or reader circuitry.

Having described the invention, it can be seen that it provides a very convenient device for acquisition and retrieval of vehicle operator performance information.

The monitor of the invention allows the owner of the vehicle or others to bring the monitor or part thereof to a convenient location where there is a television, computer, or reader to review and analyze the events. The owner may easily review recorded events regularly. Events may be captured daily or even more often. The monitor may be removed from the vehicle at the time of a crash for instant review. This would be important for medical personnel to analyze G-forces or look at visual images during the crash to look for injuries that may have been otherwise overlooked. This may also be of critical importance to crash investigators such as law enforcement or insurance investigators who need to correlate data recorded by the monitor to actual injuries and vehicle damage at the scene of a crash before the crash scene is disrupted by cleanup.

The owner may remove the monitor for safekeeping after an important event has been recorded such as a criminal attack or crash.

The monitor is easily serviced and upgraded, such as with additional memory. The monitor is more easily re-programmable with new software. A defective or malfunctioning monitor may be rapidly replaced with minimal downtime.

Although specific embodiments of the invention have been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. In combination:
   a vehicle including:
      a front end;
      a rear end; and
      a rear viewing device obscuring a portion of an operator's forward view;
   a vehicle operator performance monitor comprising:
      a housing including
         first image sensing means having an optical axis; said first image sensing means for sensing optical images and for producing a first image signal representing the sensed images;
      an event detection circuit connected to said housing producing a trigger signal responsive to detection of a predetermined triggering event;
      a playback circuit connected to said housing including:
         a persistent memory device
         an output port;
         operator control means for producing a control signal responsive to operator activation; and
         a programmed computer connected to said persistent memory, to said output port, and to said operator control means; and
      a capture circuit connected to said first image sensing means for receiving and capturing the first image signal therefrom, connected to said event detection circuit for terminating capture of the first image signal within a predetermined time period upon receipt of a trigger signal therefrom, and connected to said persistent memory device for loading the captured first image signal therein; and
   mounting means for mounting said monitor to said vehicle such that said monitor is disposed substantially within the portion of the operator's view obscured by said rear viewing device and said optical axis is directed for receiving desired images; wherein said programmed computer is programmed for downloading the first image signal from said persistent memory device to said output port responsive to a control signal from said operator control means; and wherein said playback circuit is readily removable from said housing mounted in said vehicle for removal from said vehicle to a remote location for playback.

2. The combination of claim 1 wherein:
   said first image sensing means senses images froward of said housing; and
   said monitor further includes:
      second image sensing means connected to said housing for sensing optical images rearward of said housing and for producing a second image signal representing the sensed images; and wherein said capture circuit is connected to said second image sensing means for receiving and capturing the second image signal therefrom, connected to said event detection circuit for terminating capture of the second image signal within a predetermined time period upon receipt of the trigger signal therefrom, and connected to said persistent memory device for loading the captured second image signal therein.

3. The combination of claim 1 wherein said playback circuit further includes:
   a video digital-to-analog converter for receiving the first image signal from said persistent memory device and for providing said first image signal as an analog video signal on said output port.

4. The combination of claim 3 wherein:
   said monitor further includes:
      a sound sensor connected to said housing for sensing sounds and for producing a sound signal representing the sensed sounds;
   said capture circuit is further connected to said sound sensor for receiving and capturing the sound signal therefrom and for terminating capture thereof upon receipt of the trigger signal, and for loading the captured sound signal in said persistent memory device; and
   said playback circuit further includes:
      an audio output port; and
      an audio digital-to-analog converter for receiving the captured audio signal from said persistent memory device and for providing said signal as an analog audio signal on audio output port; and wherein:
         said programmed computer is programmed for downloading the captured audio signal from said persistent memory device to said audio digital-to-analog convertor, responsive to a control signal from said operator control means.

5. The combination of claim 1 wherein:
   said monitor further includes:
      a sound sensor connected to said housing for sensing sounds and for producing a sound signal representing the sensed sounds;
   said capture circuit is further connected to said sound sensor for receiving and capturing the sound signal therefrom and for terminating capture thereof upon receipt of the trigger signal, and for loading the captured sound signal in said persistent memory device; and
   said playback circuit further includes:
      an audio output port; and
      an audio digital-to-analog converter for receiving the captured audio signal from said persistent memory device and for providing said signal as an analog audio signal on audio output port; and wherein:
         said programmed computer is programmed for downloading the captured audio signal from said persistent memory device to said audio digital-to-analog convertor, responsive to a control signal from said operator control means.

6. In combination:
   a vehicle including:
      a front end; and
      a rear end;
   a vehicle operator performance monitor comprising:
      a housing including:
         a first image sensor having an optical axis; said first image sensor for sensing optical images and for producing a first image signal representing the sensed images;
      an event detection circuit connected to said housing producing a trigger signal responsive to detection of a predetermined triggering event;
      a playback circuit connected to said housing including:
         a persistent memory device;
         an output port;

operator control means for producing a control signal responsive to operator activation; and a programmed computer connected to said persistent memory, to said output port, and to said operator control means;

a capture circuit connected to said first image sensor for receiving and capturing the first image signal therefrom, connected to said event detection circuit for terminating capture of the first image signal within a predetermined time period upon receipt of a trigger signal therefrom, and connected to said persistent memory device for loading the captured first image signal therein; and a rear viewing surface mounted to said housing obscuring a portion of an operator's forward view; and mounting means for mounting said monitor to said vehicle such that said rear viewing surface obscures a portion of an operator's forward view and said remainder of said monitor is disposed substantially within the portion of the operator's view obscured by said rear viewing surface and said optical axis is directed for receiving desired images; wherein said programmed computer is programmed for downloading the first image signal from said persistent memory device to said output port responsive to a control signal from said operator control means; and wherein said playback circuit is readily removable from said housing mounted in said vehicle for removal from said vehicle to a remote location for playback.

7. The combination of claim 6 wherein:

said first image sensing means senses images froward of said housing; and said monitor further includes:

second image sensing means connected to said housing for sensing optical images rearward of said housing and for producing a second image signal representing the sensed images; and wherein said capture circuit is connected to said second image sensing means for receiving and capturing the second image signal therefrom, connected to said event detection circuit for terminating capture of the second image signal within a predetermined time period upon receipt of the trigger signal therefrom, and connected to said persistent memory device for loading the captured second image signal therein.

8. The combination of claim 6 wherein said playback circuit further includes:

a video digital-to-analog converter for receiving the first image signal from said persistent memory device and for providing said first image signal as an analog video signal on said output port.

9. The combination of claim 8 wherein:

said monitor further includes:

a sound sensor connected to said housing for sensing sounds and for producing a sound signal representing the sensed sounds;

said capture circuit is further connected to said sound sensor for receiving and capturing the sound signal therefrom and for terminating capture thereof upon receipt of the trigger signal, and for loading the captured sound signal in said persistent memory device; and said playback circuit further includes:

an audio output port; and an audio digital-to-analog converter for receiving the captured audio signal from said persistent memory device and for providing said signal as an analog audio signal on audio output port; and wherein:

said programmed computer is programmed for downloading the captured audio signal from said persistent memory device to said audio digital-to-analog convertor, responsive to a control signal from said operator control means.

10. The combination of claim 6 wherein:

said monitor further includes:

a sound sensor connected to said housing for sensing sounds and for producing a sound signal representing the sensed sounds;

said capture circuit is further connected to said sound sensor for receiving and capturing the sound signal therefrom and for terminating capture thereof upon receipt of the trigger signal, and for loading the captured sound signal in said persistent memory device; and said playback circuit further includes:

an audio output port; and an audio digital-to-analog converter for receiving the captured audio signal from said persistent memory device and for providing said signal as an analog audio signal on audio output port; and wherein:

said programmed computer is programmed for downloading the captured audio signal from said persistent memory device to said audio digital-to-analog convertor, responsive to a control signal from said operator control means.

11. A method for playback of data collected from a vehicle triggering event comprising the steps of:

providing a vehicle having:

a front end;

a rear end; and a rear viewing device obscuring a portion of an operator's forward view;

providing a vehicle operator performance monitor comprising:

a housing including:

first image sensing means having an optical axis; the first image sensing means for sensing optical images and for producing a first image signal representing the sensed images;

an event detection circuit connected to the housing producing a trigger signal responsive to detection of a predetermined triggering event;

a playback circuit connected to the housing including:

a persistent memory device;

an output port;

operator control means for producing a control signal responsive to operator activation; and a programmed computer connected to the persistent memory, to the output port, and to the operator control means; and a capture circuit connected to the first image sensing means for receiving and capturing the first image signal therefrom, connected to the event detection circuit for terminating capture of the first image signal within a predetermined time period upon receipt of a trigger signal therefrom, and connected to the persistent memory device for loading the captured first image signal therein; wherein the programmed computer is programmed for downloading the first image signal from the persistent memory device to the output port responsive to a control signal from the operator control means; and wherein the playback circuit is readily removable from the housing;

providing mounting means for mounting the monitor to the vehicle;

mounting the monitor in the vehicle with the mounting means such that the optical axis of the first image sensing means is directed for receiving desired images;

removing the playback circuit from the housing so as to leave the mounted housing in the vehicle;

providing a video display;

connecting the output port to the video display; and providing a control signal with the operator control means to the programmed computer for downloading the first image signal from the persistent memory device to the output port and whence to the video display.

12. The method of claim 11 wherein:

the playback circuit further includes:
 a video digital-to-analog converter for receiving the first image signal from the persistent memory device and for providing the first image signal as an analog video signal on the output port; and wherein the step of providing a video display includes providing a video display for accepting analog video signals.

* * * * *